Dec. 9, 1958     J. W. PHILIPPOVIC     2,863,589
GRAVIMETRIC BATCH FEEDER

Filed Sept. 24, 1956     3 Sheets-Sheet 1

INVENTOR.
JOACHIM WOLFGANG PHILIPPOVIC
BY
HIS ATTORNEY

Dec. 9, 1958   J. W. PHILIPPOVIC   2,863,589
GRAVIMETRIC BATCH FEEDER
Filed Sept. 24, 1956   3 Sheets-Sheet 2

INVENTOR.
JOACHIM WOLFGANG PHILIPPOVIC
BY
HIS ATTORNEY

United States Patent Office 2,863,589
Patented Dec. 9, 1958

2,863,589

GRAVIMETRIC BATCH FEEDER

Joachim Wolfgang Philippovic, Indiana, Pa., assignor to Syntron Company, Homer City, Pa., a corporation of Delaware Application September 24, 1956, Serial No. 611,680

13 Claims. (Cl. 222—55)

This invention relates generally to feeders and more particularly to gravimetric batch feeders and the control therefor.

Gravimetric feeders may be of the continuous feeding type or batch feeding type. The former provides a weighing device supporting a feeder that may be operated continuously or intermittently but the measured weight is only of the material currently passing over the feeder on the weighing device. The weighing device is set for a specific weight of the material to be fed at all times or at least to allow a predetermined weight to be supplied. If the weight of the material is off, more or less, the speed of the feeder is controlled to supply an accurate average weight of material and thus compensate for any change in weight.

A batch type gravimetric feeder has the batch hopper containing the material to be fed together with the feeder supported on the weighing device. Here the batch is weighed and initially balanced and the feeder is controlled to deliver this batch of material at a predetermined rate which may also follow a desired predetermined feed pattern. The material is delivered or diminishes commensurate with the rate that the poise of the weighing device is moved down the beam of the weighing device. This rate of diminishing weight of the batch is controlled by operating the poise at a desired rate of speed which may be continuous, or intermittent in cycling time periods of consecutive off or on time intervals, being one percent to ninety-nine percent of each time cycling period. These periods of on and off in the intermittent control are selective in any desired cycling time period and the control by on and off periods may run from one to ninety-nine units of the cycling period selected. This control provides very accurate feeding. The movement of the poise along the beam actuates a control over the operation of the feeder. Thus the time cycling periods of off and on operation of the motor moving the poise down the beam causes the poise to accurately control the feeder through the swing of the beam of the weighing device. The swing of the beam in turn excites a pickup generator that controls the firing of the thryatron that operates the feeder. This electronic control provides accuracy of feed not obtainable to such a high degree in the other types of gravimetric feeders.

Other objects and advantages of this invention appear hereinafter in the following description and claims.

The accompanying drawings show for the purpose of exemplification without limiting this invention or the claims thereto, certain practical embodiments illustrating the principles of this invention wherein:

Figure 1:
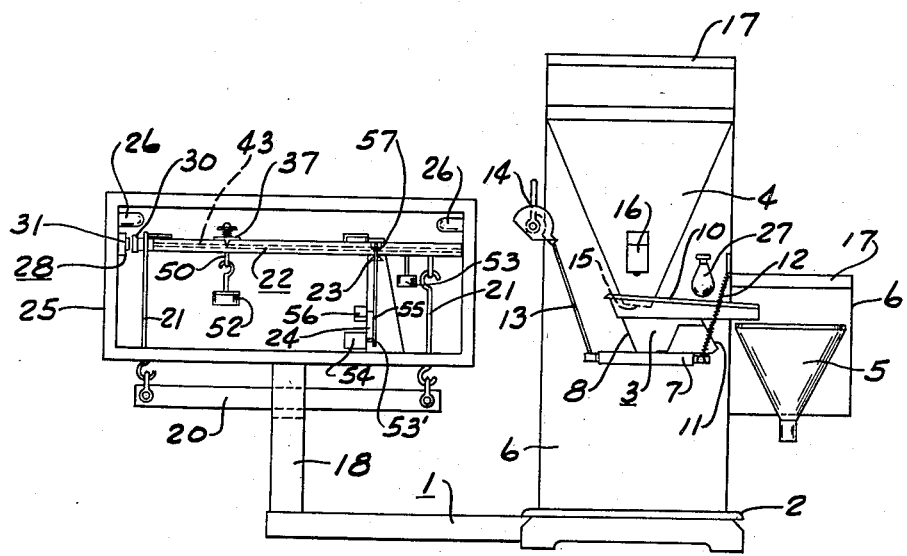
Fig. 1 is a view in side elevation of the complete device.

Referring to Fig. 1 of the drawings this gravimetric batch feeder comprises the weighing device 1 which is what is commonly known as a platform scale wherein the scale platform 2 supports the feeder 3, the batch hopper 4, the discharge funnel 5, all of which are enclosed in the housing 6. The feeder 3 has the massive base 7 and the sloping springs 8 support the trough 10 and is driven by the electromagnet motor 11. This is an old and well known type of electromagnetically operated vibratory feeder and hopper arrangement shown in U. S. Patent 2,366,075. The base 7 is suspended by two springs 12 suspended from the housing 6 at its front or discharge end and by the cable 13, the length of which is controlled by the handle 14 supported by the rear of the housing 6. The adjustment of the cable 13 varies the proximity of the floor of the feeder trough 10 relative to the throat 15 of the hopper and thus aids in controlling the flush of the materials being fed.

The hopper 4 has the electromagnetic virbrator 16 mounted on the side thereof to maintain the materials loose.

The batch of materials is placed in the top of the hopper 4 which may be covered by a lid 17.

The weighing device 1 has the usual well known standard 18 through which the links (not shown) are passed from the platform 2 and connected to the lower beam 20 that is in turn suspended through the hook rods 21 from the upper beam 22 that is fulcrumed on the knife edge 23 supported at the top of the post 24. The post is mounted in the enclosed box structure 25 that is preferably steel with glass windows to shield out any stray electrical fields.

Lamps 26 are mounted at each end within the box 25 to keep the temperature constant and permit a visual check of the operation of the device. A lamp 27 is housed above the feeder trough 10 to keep the material dry and provide visual check of the flow of material to the funnel.

At the left end of the beam 22 is mounted the pickup generator 28 which has the laminated armature 30 mounted on the beam end and the field core 31 mounted inside the box in operative relation. The core 31 is U-shaped with two legs and poles. A winding 32 is on each leg and these windings are connected in series. These windings are wound to have an accumulative pickup from the laminated armature 30 that swings on the end of the beam 22.

Figure 4:
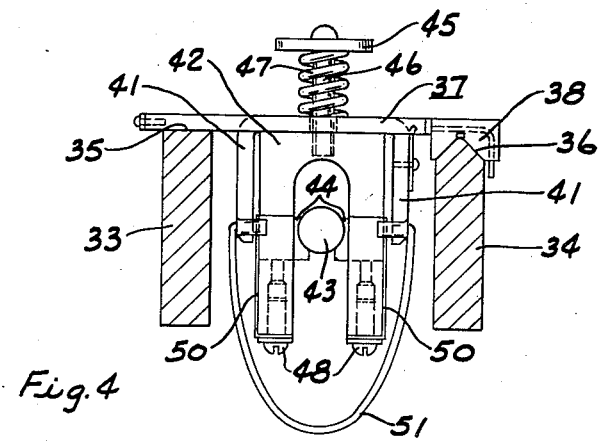
Fig. 4 is an enlarged view in end elevation of the poise.
Figure 3:
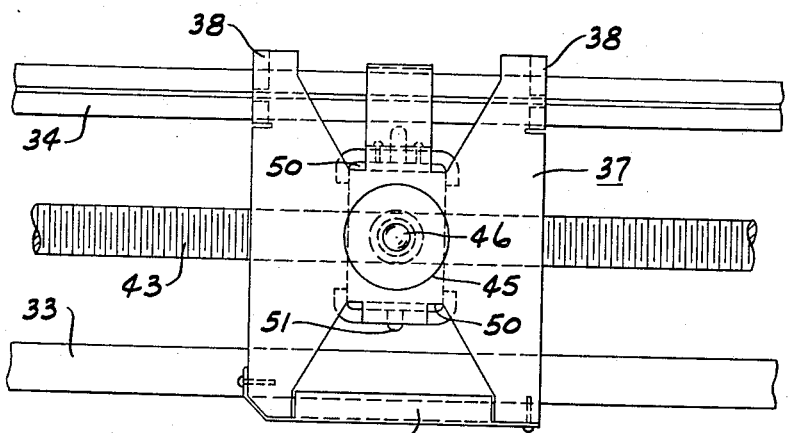
Fig. 3 is an enlarged top plan view of the poise.
Figure 2:
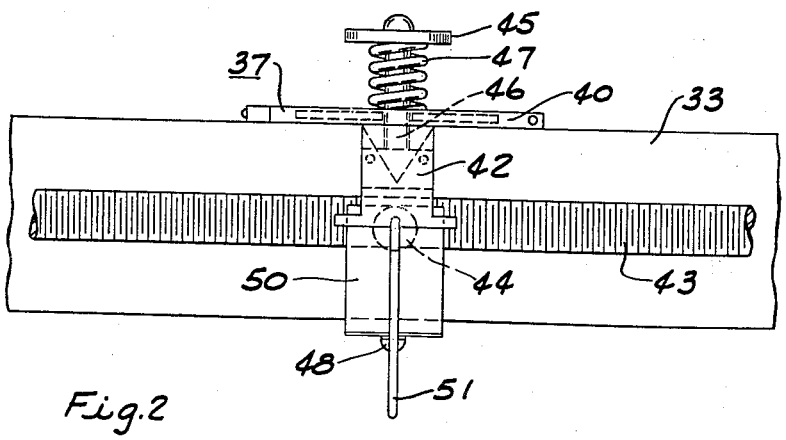
Fig. 2 is an enlarged view in side elevation of the poise.

The beam 22 is made of two bars 33 and 34 as shown in Figs. 3 and 4. The bar 33 has a flat top 35 but the bar 34 has an angular top 36 to form a way and the poise slide 37 has complementary shaped shoes 38 that fit and slide along this bar and is thus guided by this way 36. The notched shoes 38 are at opposite ends of the slide to keep the slide 37 in proper alignment. The slide 37 is H-shaped as shown in Fig. 3 and the opposite ends of the H are flat and ride over the flat top 35 of the bar 33 and also support the ends of the flat shoe 40 which rides on the outer portion of the flat top of the bar 33 and takes all the wear being a hardened bearing member, the same as the shoes 38. The center portions of the slide 37 are bent downwardly to form the guides 41 for the clutch member 42 that is U-shaped and embraces both sides of the rotary lead screw 43. Within the clutch member are the opposed clutch surfaces 44 which in this case are felt and engage the thread of the rotary lead screw and carry the poise slide therealong.

To release the clutch one merely depresses the knob 45 on the top of the stem 46 that is secured at its other end to the clutch member 42. By depressing the knob the spring 47 is compressed and the clutch lowers to withdraw the clutch faces 44 from the rotary lead screw and permits the poise to be slid to any desired position such as a balancing position for the batch of material in the hopper. The underside of the clutch 42 has the screws 48 that support the leaf springs 50 which in turn apply pressure to the clutch pads 44 to cause them to embrace the lead screw.

A bail 51 depends from the depending guides 41 to support the balancing poise weight 52 as shown in Fig. 1. It is the function of the balancing poise 52 to determine the quantity of material in the hopper to be discharged at any one period of time. Thus the poise 52 in effect balances the weight of the material in the hopper. A counter poise weight 53 is suspended on the opposite side of the fulcrum from the poise weight 52. By changing these weights most any feed weight combination may be obtained.

Directly below and in line with the fulcrum is the sprocket 53' of a constant speed A. C. motor 54 that operates the chain 55 that passes over and drives the sprocket of a revolution counter 56. Another sprocket 57 is mounted on the lead screw 43 directly in line with the beam fulcrum that supports the bars 33 and 34. Thus the constant speed motor 54 drives the lead screw 43 through a light chain at the fulcrum which does not affect the weight or load on the beam. The counter 56 can be adjusted by sprocket size so that the digits read represent the total amount of material fed. This calibration may be read from tables for different poise and counter poise weights. This totalizer of the weight of material delivered is obviously a function of the position of the counter poise along the beam. Assuming that the counter or totalizer is set to zero when the new batch is weighed in and ready to go the calibration may be such to give the actual pounds delivered out of that batch. This totalizer may be accumulative from one batch to another or it may be made to read only for each batch. This reading can by the use of servomotors be repeated at a remote station.

Figure 5:
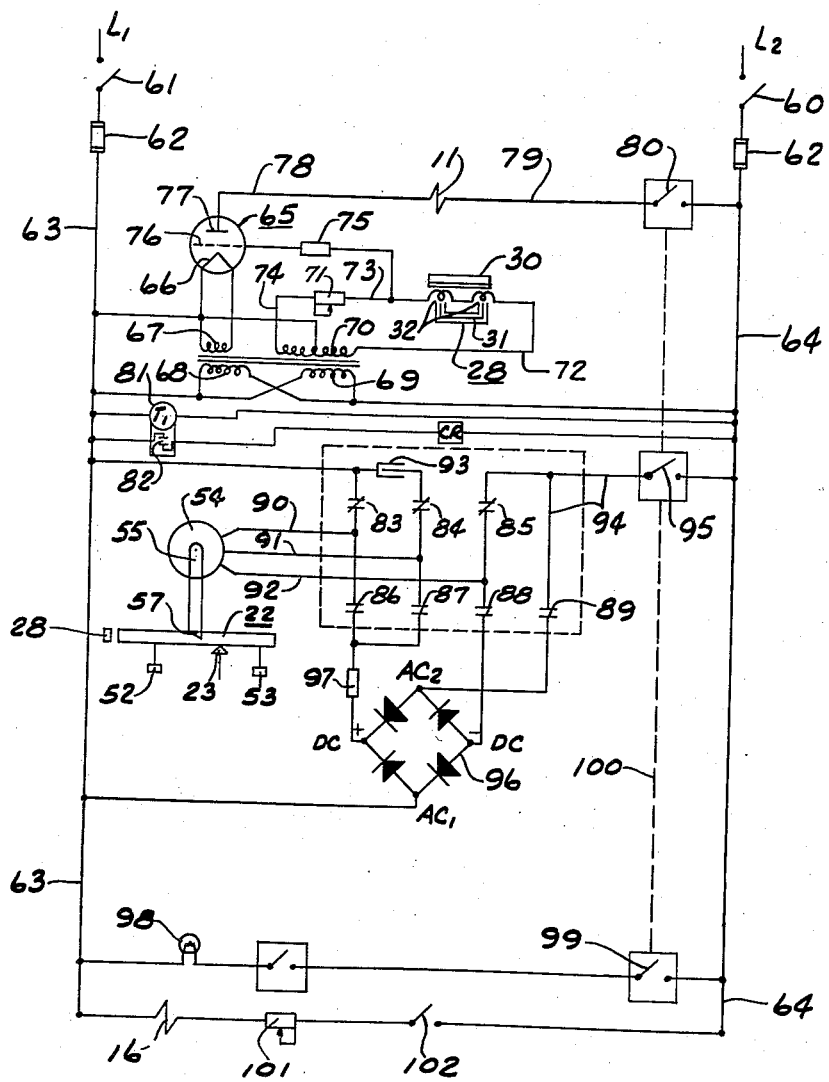
Fig. 5 is a schematic diagram of the electrical control circuit.

When the batch is supplied to the hopper and the poise driving motor 54 is energized at predetermined time periods, which may be determined by a timer, the lead screw is driven accordingly. The movement of the poise 52 down the beam towards the fulcrum causes the pickup generator 28 to excite the feeder motor 11 to the proper degree of amplitude to feed the material at the proper rate and diminishing weight must, of course, be checked back through the weighing device and corrected accordingly. This control is shown in Fig. 5 wherein the alternating current supply line is indicated as L1 and L2 connected by the main switch blades 60 and 61 and properly fused at 62. The fuses connect lines 63 and 64 to each part of the control circuit, the first of which is the triode 65, the cathode 66 of which is supplied with current from the closed secondary transformer circuit 67 the primary of which is made in two windings 68 and 69 so that the same transformer may double for two voltages depending whether they are connected in multiple or in series across the supply lines 63 and 64. They are shown connected in multiple and if the supply voltage was twice that which the present circuit is shown they would be connected in series.

The secondary 70 has a center tap to line 63 and this winding is connected to a closed circuit including the coils 32 of the pickup generator and the potentiometer 71 by the lines 72, 73 and 74. The line 73 is also fed through the grid resistor 75 to the grid 76 of the triode. The anode 77 of this triode is connected by the line 78 to the field of the feeder motor 11 and thence through line 79 and switch 80 to the opposite supply line 64. The pickup generator controls the firing of the triode 65 as well as the vibration amplitude of the feeder 4 by changing the energy supplied to the grid of the triode to change the output of the feeder relative to the up and down movement of the beam. The pickup thus signals the feeder in position of the beam to determine an increase or decrease in the output of the material and when the poise stops the feeder becomes deenergized.

The next part of the control circuit is the timer motor 81 which is a standard item not forming a part of this invention. This timer motor is connected directly across the supply lines 63 and 64. This timer motor may have a front or normally open contact and a back or normally closed contact. It is shown with the front contact 82 that is in series with the CR relay and this series circuit is across the supply line 63, 64. The timer 81 may be set to close the contact 82 for one percent of the cycling time period providing periodic interruptions of the delivery of a part or a whole of the batch of material in the hopper, or it may be set to close the contact 82 as long as ninety-nine percent of the time of the cycling period which would continue the operation of the feeder until the whole batch was fed from the hopper. Thus the timer 81 determines the actual cycling period.

The CR relay has use for seven contacts as indicated. Contacts 83, 84 and 85 are back or normally closed contacts and are for the purpose of supplying AC to run the motor 54 and contacts 86, 87, 88, 89 are front or normally open contacts and are for the purpose of supplying DC to the motor 54 to quickly stop and hold the same from running. The lines 90, 91 and 92 from the motor 54 are connected to the heel contacts of their respective front and back contacts 86, 87, 88 and 83, 84 and 85. The back contacts supply the leads 90, 91 and 92 respectively with current from the AC supply line 63, 64, contact 83 connects directly to line 90 to the motor, AC supply line 63 is connected through the condenser 93 and contact 84 and line 91 to the motor. Line 92 is connected from the motor through contact 85, line 94, switch 95 to the return supply 64. The condenser 93 merely shifts the phase to actuate this single phase constant speed motor 54. Other well known types of motors could be employed. With the CR relay deenergized alternating current is supplied to normally run the motor 54 which rotates the lead screw and moves the poise down the beam.

A full wave rectifier of the dry disc type is shown as the complete bridge circuit 96 having the opposite AC1 and AC2 points and the DC+ and the DC— points with the rectifiers in each leg and permitting current flow in the direction of the arrow head. The AC1 bridge point is connected to supply the AC line 63 and the AC2 bridge point is connected through the front contact 89 of the CR relay to line 94 and switch 95 to the return AC line 64.

The DC— bridge point is connected through front contact 88 of the CR relay to motor line 92.

The DC+ bridge point is connected through the limiting resistor 97 to both front contacts 86 and 87 of the CR relay to motor lines 90 and 91 respectively.

With this circuit the motor 54 runs on AC power when the CR relay is down or deenergized but when the timer contact 82 closes and energizes relay CR it first opens its back contacts to isolate its windings from the AC source of power supply and immediately closes the front contacts to supply the motor 54 with DC current which causes the motor to stop abruptly with no possibility of overrunning. This functions as a brake and the poise 52 driven by the screw 43 rotated by the motor 54 then stands still preventing any feed through the pickup generator and thus stops feeder motor 11. The poise 52 must move down the scale to energize the pickup and make the feeder operate.

When the timing period is over the timer 81 opens its contact 82 and thus deenergizes the CR relay which again establishes the supply of alternating current through the back contacts 83, 84 and 85 to run the constant speed motor 54 until the next interruption of the timer 81. While the motor 54 runs the poise descends the beam scale toward the fulcrum and the pickup generator 28 continues to fire the thyratron 65 to maintain operation of the feeder motor 11. This control provides a very accurate feed per unit of time and feeding only a batch of material from the hopper 4 makes the feeder a batch type feeder as only a given quantity of material can be supplied over any one period of time.

An indicator light 98 is connected in series with the switch 99 to show that current is supplied to the control. Switches 80, 95 and 99 are all mechanically connected as indicated by the broken line 100 so that they will all open when the poise reaches the end of its run down the balance beam. This interrupts the circuit of the anode 78, the motor 54, the rectifier 96 and the indicator light 98.

The vibrator 16 is connected in series with the potentiometer 101 and the switch 102 across the supply lines 63, 64. This is used only when necessary to keep the material loose and freely flowing from the hopper.

The uniform spaced periods that the timer operates to energize the CR relay to stop the motor 54 by applying DC to its windings and stop the feeder determines the rate at which the batch of material in the hopper is fed. This timer may never energize the CR relay and the batch of material will be continuously fed. The timer may be set to energize the relay CR at periods equivalent to a specific number of seconds, or a specific number of minutes, or even hours. The period during which the poise 52 moves down the scale the batch is being fed and the off period when the CR relay is energized no material is being fed from the hopper 4. The pickup adjusts the amplitude of the feeder during its operating periods to produce a uniform feed and stops the feeder when the poise 52 is stopped.

I claim:

1. A control for feeding a batch of material comprising a weighing device carrying a batch of material to be fed, a feeder for discharging material from the batch, a balancing poise on the weighing device movable commensurate with the material remaining in the batch, a motor for moving the poise at the rate the material is to be fed from the batch, a pickup generator mounted adjacent said weighing device and operative upon movement of the weighing device on both sides of its balanced condition, and a circuit controlled by said pickup generator to vary the rate of feed of material commensurate with the balanced condition of the moving poise.

2. The structure of claim 1 characterized in that said poise moving motor is a constant speed motor, and a timer connected with the circuit of said motor to interrupt the operation of said motor at regular intervals.

3. The structure of claim 2 characterized in that said poise moving motor is operated by AC, and a relay controlled by said timer for switching the circuit of said motor from AC to DC to stop said motor during its interrupted time interval.

4. The structure of claim 3 characterized in that the back contacts of said relay supply AC to said motor, and a rectifier connected to supply DC to the front contacts of said relay, said motor being connected to the heels of the back and front relay contacts feeding said motor.

5. The structure of claim 1 which also includes a limit switch on said weighing device and actuated at the end of the movement of said balancing poise to interrupt said batch feeder and said motor and close an indicating circuit.

6. The structure of claim 1 characterized in that said pickup generator is in the form of an armature movable with said weighing device, and field means adjacent thereto and sufficiently coupled to induce changes in a current passing therethrough.

7. The structure of claim 6 characterized in that said batch feeder includes a vibratory feeder actuated by a triode the grid of which is controlled by the variable current of said field means in said pickup generator.

8. The structure of claim 2 characterized in that said timer interrupts said motor at least one percent out of every operating period of ninety-nine percent.

9. A poise member comprising a slide operating over a rotary lead screw, a clutch carried by said slide and having a clutch face to engage said lead screw, and spring means to bias the movement of the clutch face into the lead screw.

10. A control for feeding a batch of material comprising a weighing device carrying a batch of material to be fed, a feeder for discharging material from the batch, a balancing poise on the weighing device movable commensurate with the material remaining in the batch, a constant speed motor for moving the poise at the rate the material is to be fed from the batch, and circuit means operative on the movement of the weighing device to control the operation of the feeder.

11. The feeder control of claim 10 characterized by a timer connected with the circuit of said motor to interrupt the operation of the same at regular intervals.

12. The feeder control of claim 11 characterized in that said circuit means includes a pickup generator actuated by the movement of the weighing device to vary the amplitude of the feeder and to stop the feeder when the balancing poise is stopped.

13. The feeder control of claim 10 characterized by a relay controlled by said timer for switching the circuit of said motor to stop the same without overrunning.

References Cited in the file of this patent

UNITED STATES PATENTS

| | | |
|---|---|---|
| 1,777,670 | Hansman | Oct. 7, 1930 |
| 1,922,883 | Crago | Aug. 15, 1933 |
| 2,103,400 | Weckerly | Dec. 28, 1937 |
| 2,276,383 | Francis | Mar. 17, 1942 |
| 2,322,218 | Baird | June 22, 1943 |
| 2,323,440 | Baird | July 6, 1943 |
| 2,366,075 | Weyandt | Dec. 26, 1944 |
| 2,618,406 | Kast | Nov. 18, 1952 |

UNITED STATES PATENT OFFICE

CERTIFICATE OF CORRECTION

Patent No. 2,863,589                                                   December 9, 1958

Joachim Wolfgang Philippovic

It is hereby certified that error appears in the printed specification of the above numbered patent requiring correction and that the said Letters Patent should read as corrected below.

Column 6, line 37, for the claim reference numeral "11" read -- 10 --; line 42, for the claim reference numeral "10" read -- 11 --.

Signed and sealed this 16th day of June 1959.

(SEAL)
Attest:

KARL H. AXLINE
Attesting Officer

ROBERT C. WATSON
                                                                                 Commissioner of Patents